United States Patent [19]

Cook

[11] 4,152,838

[45] May 8, 1979

[54] STRAIGHT EDGE LEVEL

[76] Inventor: Joseph G. Cook, 27 Tulip Dr., Gretna, La. 70053

[21] Appl. No.: 861,729

[22] Filed: Dec. 19, 1977

[51] Int. Cl.² ............................................. G01B 19/62
[52] U.S. Cl. ......................................... 33/342; 33/374
[58] Field of Search .................... 33/88, 89, 374, 103, 33/161, 342, 144, 338, 375, 376

[56] References Cited

U.S. PATENT DOCUMENTS

| | | | |
|---|---|---|---|
| 149,532 | 4/1874 | Sherwin | 33/161 |
| 686,360 | 11/1901 | Smiddy | 33/374 |
| 888,070 | 5/1908 | Dissell | 33/103 |
| 1,413,056 | 4/1922 | Parrish et al. | 33/374 |
| 2,145,988 | 2/1939 | Meder | 33/342 |
| 2,551,524 | 5/1951 | Bullivant | 33/374 |
| 2,878,569 | 3/1959 | Metrulis | 33/88 |
| 3,089,245 | 5/1963 | Cromer et al. | 33/102 X |
| 3,273,246 | 9/1966 | Siberini | 33/103 X |
| 3,328,887 | 7/1967 | Wright | 33/374 X |

*Primary Examiner*—Harry N. Haroian
*Attorney, Agent, or Firm*—Keaty and Garvey

[57] ABSTRACT

A straight edge level is provided which is comprised of a level body having a plurality of conventional leveling bubbles thereon, and a sliding scale member which is extendable from but substantially planar the level body itself. In the preferred embodiment, a scale is provided on the surface of the level body, and a second scale provided on the surface of the slide member. In operation, an extension of the slide member will produce a scale reading at the end portion of the level body from which the slide member extends. The scale provided on the level body begins its numerical climb from that same location on the level body. Thus, in operation, the user can add the numbers appearing on the two scales and get a desired overall measurement.

7 Claims, 5 Drawing Figures

STRAIGHT EDGE LEVEL

BACKGROUND OF THE INVENTION

1. Field of the Invention

The present invention relates to hand tools, and more particularly the present invention relates to levels, wherein a supplemental scale is provided in coincident sliding arrangement on a level body for making extended measurements therefrom.

2. General Background and Prior Art

Carpenters and like handy-men often are required to make a measurement and hold the ruler perfectly level at the same time. This is important, since the measurement along a wall, for example, will only be accurate if in fact the rule is held directly parallel with the floor (i.e., in a level position). Several devices have attempted to solve this problem and some of these prior art devices have been awarded U.S. Patents. A listing of some prior art devices known to applicant is provided in the following table.

| U.S. Pat. No. | Inventor(s) | Date |
| --- | --- | --- |
| 683,254 | A. Delin | Sept. 24, 1901 |
| 1,026,579 | C. R. Hauke | May 14, 1912 |
| 1,119,450 | E. O. Parr | Dec. 1, 1914 |
| 1,221,777 | A. Uney | Apr. 3, 1917 |
| 1,629,829 | C. O. Linn | May 24, 1927 |
| 1,844,762 | H. W. Hilton | Feb. 9, 1932 |
| 2,551,524 | L. J. Bullivant | May 1, 1951 |
| 2,878,569 | R. R. Metrulis | Mar. 24, 1959 |
| 3,492,737 | C. J. Swanson | Feb. 3, 1970 |

3. General Discussion of the Present Invention

The present invention solves the prior art problems and shortcomings in a simple and inexpensive manner. The present invention provides a combination level and rule, with a rule being slideable on the level body and having a scale thereupon. The body of the level is likewise provided with a scale, with the two scales being addable together to get a desired reading. The level body is provided with a plurality of conventional leveling elements which can be for example, tubes of liquid having bubbles therein. The bubble assuming a central position in the tube when the level is in a perfectly parallel position with the earth surface.

The present invention provides on the level body which has the leveling elements and a scale in ascending substantially equally spaced order from one end to the other thereof. There is further provided a second sliding ruler attached and mounted upon the leval body in sliding relationship thereto. The second scale is likewise sequentially and equally spaced along the sliding rule portion of the device.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETALIED DESCRIPTION OF THE PREFERRED EMBODIMENT

Figure 1:
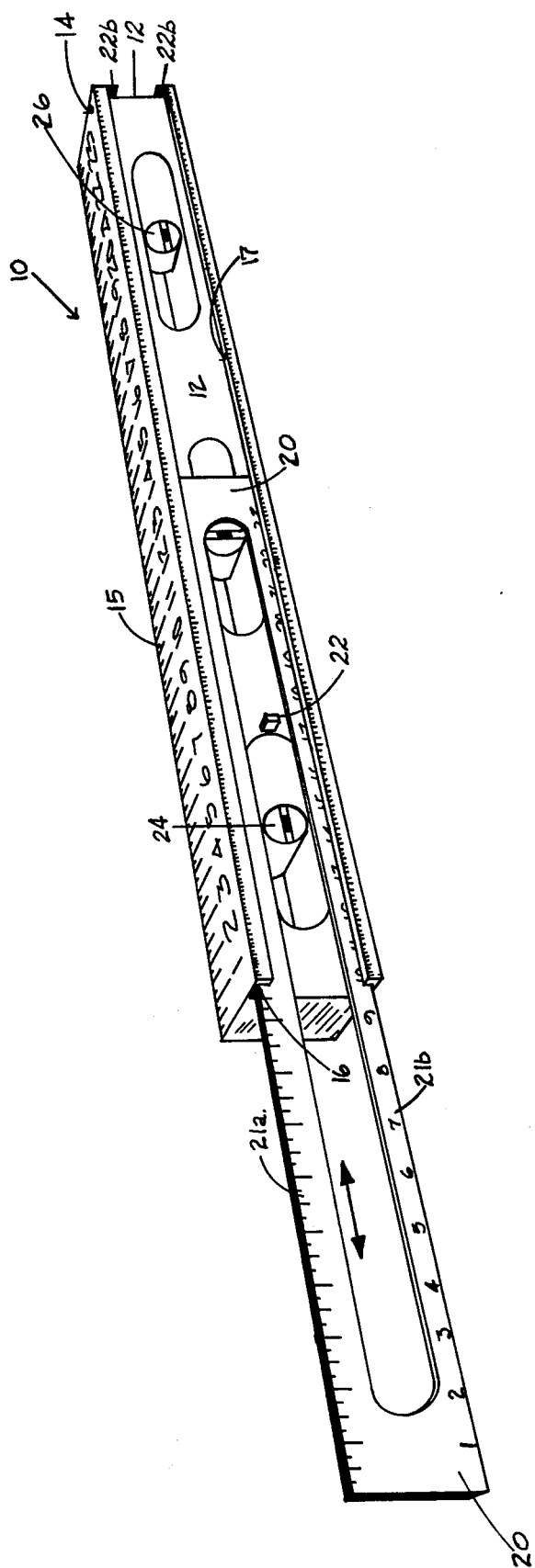
FIG. 1 is a perspective view of the preferred embodiment of the apparatus of the present invention.

As can best be seen in FIG. 1, there is seen a straight edge level 10 which is comprised generally of a level body 12 and a slide member 20.

Figure 4:
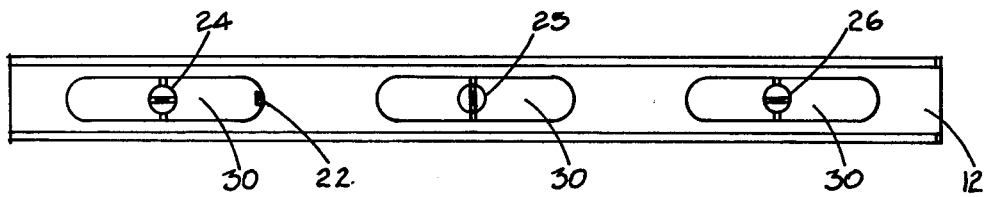
FIG. 4 is a front view of the level body portion of the preferred embodiment of the apparatus of the present invention.

Slide member 20 is slideably attached in substantially parallel coplaner relationship with level body 12 and is mounted in the pair of spaced groves 16, 17 (see FIG. 4). Slide member 20 can slide along body 12 as is illustrated by the arrow in FIG. 1.

Figure 3:
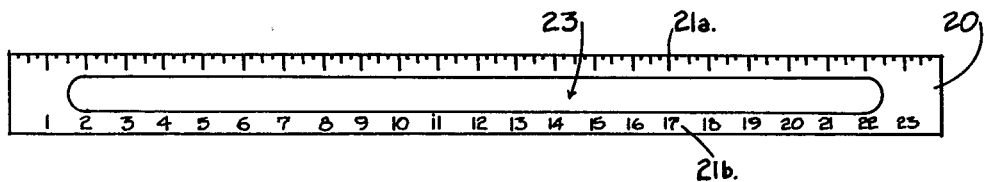
FIG. 3 is a front view of the sliding scale portion of the preferred embodiment shown in FIGS. 1 and 2.

Body 12, as can best be seen in FIG. 3, is provided with a plurality of leveling members 24, 25, 26. Each leveling member 24-26 can be conventional level bubble which is for example, a cylindrical clear tube having a viscus liquid therein and a single bubble. Centering the bubble within the cylindrical tube would indicate that the longitudinal axis of the tube is in fact parallel substantially with the earth's surface, or perpendicular to the line upon which gravity acts. Such leveling members are conventional and are known in the art.

Figure 2:
FIG. 2 is a top view of the preferred embodiment of the apparatus of the present invention.

Each leveling member 24, 25, 26 is affixed within an elongated oval shaped opening 30 provided within level body 12. Stop members 22, 22b are provided at the opposite end portion of body 12, which stop members prevent the inadvertent escape of slide member 20 from its normal position within groves 16, 17 of body 12. The top portion 14 (see FIG. 2) of level body 12 can be provided with a scale 15 which sequentially increases in value from one end to the other. In the embodiment shown in FIG. 2, the numerals shown on the upper surface 14 of body 12 indicate inch measurements from zero (0) to twenty-four (24) inches. The numerical indicia shown on the upper portion 14 of body 12 indicate sequentially increasing inch values. Such indicia are in face equally spaced in the preferred embodiment.

In FIG. 3 there can be seen slide member 20 which likewise is provided with a sequentially increasing scale 21b at its lower portion, which scale 21b has numerical indicia thereon. The slide member 20 is likewise provided with an upper scale 21a which in the preferred embodiment is not provided with numerical indicia, but rather equally spaced markings which can correspond for example, to inch, half inch and quarter inch divisions. The lower numerical indicia on lower scale 21b would correspond to and be the same distance apart as the corresponding marks above the scale 21a.

Figure 5:
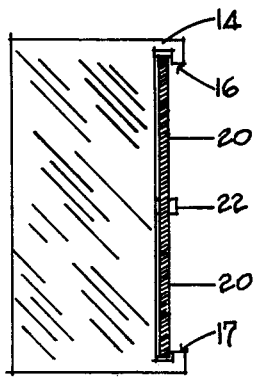
FIG. 5 is an end view of the preferred embodiment of the apparatus of the present invention.

As can best be seen in FIGS. 1 and 5, sliding member 20 would fit in and slide along groove members 16, 17. Slide member would be free to slide from one end of body 12 to the other end thereof between stops 22 and 22b. In the preferred embodiment, an elongated slot 23 is provided in slide 20. The purpose of slot 23 is to provide an opening so that slide 20 will freely move notwithstanding the presence of stop 22a. Only when slide member 20 abutts stop 22 by hitting stop 22a with the end portions of slot 23, will the motion of slide member 20 be stopped. Stop member 22a could be placed anywhere along the length of body 12 depending on the desired maximum extension which would be provided by slide 20. Stops 22b are placed at the opposite end portion of body 12 from which slide 20 is extendible. Stops 22b hold sliding movement of slide 20 when it is in a withdrawn position adjacent body 20.

In FIG. 1, there can be seen slide member 20 extending a distance out beyond the edge of body 12, a distance of approximately nine (9) to ten (10) inches. It can be seen from an inspection of the drawing, (see FIG. 1) that slide member 20 could in fact extend another ten (10) inches more or less before stop 22 would be engaged limiting further extension of slide member 20.

The apparatus of the present invention, as described herein, would have several applications to a variety of circumstances which have been problems to carpenters, handymen and the like in the past.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A extensible level-rule apparatus comprising:
    a. an elongated, substantially rectangular level body, said body being provided with a pair of parallel flat level sides;
    b. level bubble means mounted within said level body for indicating when a flat level side is oriented in a substantially level position; said body having a pair of elongated inwardly facing gooves thereon;
    c. an elongated slide member slidably mounted on said rule body in said inwardly facing grooves in front of said level bubble means and sliding in coincident relationship with said level body so as to be extensible therefrom, said slide member being provided with a linear scale on the surface thereof, said scale having a minimal value on one edge portion, said scale providing indicia in equally spaced scalar relationship in increasing values toward the other edge portion of said slide member, said slide member having an elongated longitudinal slot therein said level bubble means being visible by sighting through said slot throughout substantially the entire sliding movement of said slide member relative to said body member.

2. The apparatus of claim 1 wherein there is further provided a scale on said level body.

3. The apparatus of claim 1 wherein there is further provided stop means on said level body for preventing the inadvertent escape of said slide member from said level body.

4. The apparatus of claim 3, wherein said stop means is a projection on said level body and, the inadvertent escape of said slide member from said level body being prevented by the abutment of an end of said slot against said stop member.

5. The apparatus of claim 1 wherein said indicating means is at least one clear tube member having a liquid therein and at least one bubble.

6. The apparatus of claim 1 wherein said level bubble means is a plurality of leveling bubbles, each bubble being visible by sighting through said longitudinal slot.

7. The apparatus of claim 1 wherein said level body has a substantially rectangular cross section, the opposite sides of which are substantially parallel coplanar.

* * * * *